United States Patent

Heinrich et al.

[11] Patent Number: 6,136,065
[45] Date of Patent: Oct. 24, 2000

[54] METHOD AND DEVICE FOR DIRECT REDUCTION OF ORE FINES

[75] Inventors: Peter Heinrich, Geldern; Klaus Knop, Bottrop, both of Germany

[73] Assignee: Ferrostaal Aktiengesellschaft, Germany

[21] Appl. No.: 09/155,961

[22] PCT Filed: Jan. 17, 1998

[86] PCT No.: PCT/DE98/00159

§ 371 Date: Oct. 5, 1998

§ 102(e) Date: Oct. 5, 1998

[87] PCT Pub. No.: WO98/35063

PCT Pub. Date: Aug. 13, 1998

[30] Foreign Application Priority Data

Feb. 7, 1997 [DE] Germany .......................... 197 04 566
Feb. 19, 1997 [DE] Germany .......................... 197 06 348

[51] Int. Cl.[7] .................................................. C21B 11/00
[52] U.S. Cl. .................................. 75/444; 75/451; 266/172
[58] Field of Search ..................... 75/444, 451; 266/172

[56] References Cited

U.S. PATENT DOCUMENTS

| | | | |
|---|---|---|---|
| 4,978,387 | 12/1990 | Kepplinger | ................................ 75/445 |
| 5,382,277 | 1/1995 | Rose | ............................................ 75/450 |
| 5,545,251 | 8/1996 | Knop . | |
| 5,560,762 | 10/1996 | Bresser et al. | ............................. 75/447 |

FOREIGN PATENT DOCUMENTS 39 32 182A 4/1990 Germany .
43 26 562A 9/1995 Germany .

*Primary Examiner*—Melvyn Andrews
*Attorney, Agent, or Firm*—McGlew and Tuttle, P.C.

[57] ABSTRACT

A method and device are provided for direct reduction of ore fines in a wide range of particle size, the reducing agent being hydrogen placed in a fluidized bed gutter with a plurality of sequentially arranged chambers. The fluidization rate in the supply base is set so that a defined class of particle size remains in the chamber concerned where it will be submitted to a reduction process and that the finest particle size fraction is discharged from the chamber, then precipitated in a hot gas cyclone to solid material (or fines) and gas. The ore fines precipitated in the cyclone then reaches the following chamber. The gas from all the hot gas cyclones is fed by a collector to the pre-heater. After reduction in the chambers, the ore fines are conveyed in pressure vessels for submission to further processes.

12 Claims, 1 Drawing Sheet

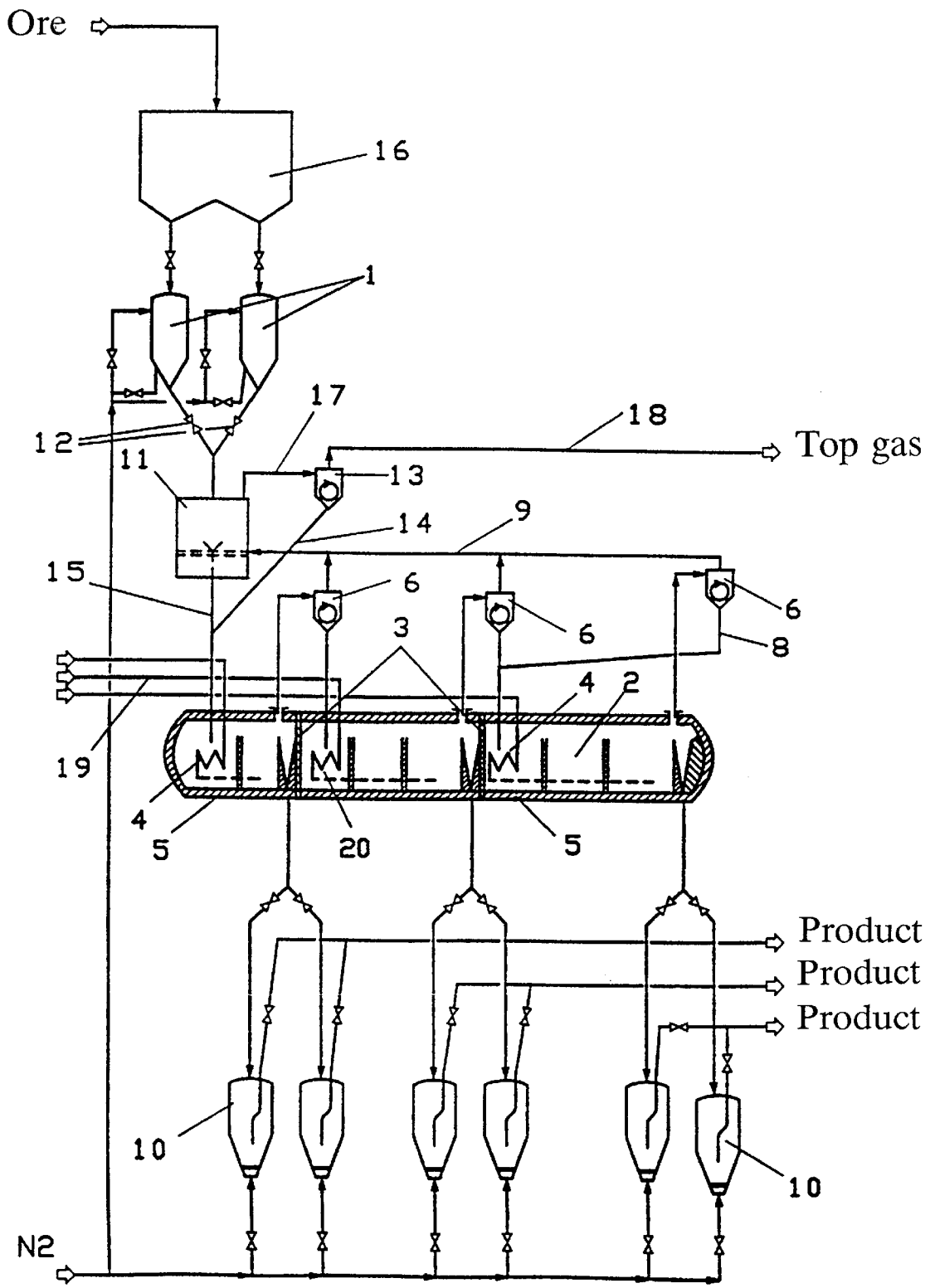

METHOD AND DEVICE FOR DIRECT REDUCTION OF ORE FINES

FIELD OF THE INVENTION

The present invention pertains to a process for the direct reduction of ore dusts or fines with a broad particle size spectrum by means of hydrogen in a horizontal fluidized bed chute. The present invention also pertains to a device for carrying out this process.

BACKGROUND OF THE INVENTION

A horizontal reactor with internal oncoming flow bottoms with all the devices necessary for the operation of such a reactor has been known from DE 43 26 562 C2.

The horizontal fluidized bed reactor according to DE 43 26 562 C2 has a drawback, namely, that it can operate only with a predetermined particle size spectrum, which is determined by the oncoming flow velocity (fluidization velocity) in the fluidized bed. Thus, a different particle size spectrum requires different oncoming flow velocities. In addition, screen classification is necessary before charging the material onto the fluidized-bed reactor.

SUMMARY AND OBJECTS OF THE INVENTION

The object of the present invention is to improve the process claimed in the abovementioned document such as to make it possible to optimally reduce the broadest possible particle size spectrum of ore dust or fines in a horizontal fluidized-bed chute. Another object of the present invention is to design a prior-art fluidized-bed chute such that the intended process can be carried out. Another object of the present invention is to guarantee an optimal mode of operation of the reduction plant in terms of heat economy.

Reference may be made to parts of the specification documents of DE 43 26 562 C2 in the description of the device. DE 43 26 562 C2 corresponds to U.S. Pat. No. 5,545,251 which is hereby incorporated by reference.

The present invention is based on the use of the basic concept of the reactor described in DE 43 26 562 C2 and U.S. Pat. No. 5,545,251.

According to the process of the present invention and of the device, it is possible to process ore dusts with a particle size spectrum ranging from less than 6.3 mm to 0.02 mm. Particle sizes ranging from less than 3.0 mm to 0.02 mm are preferably selected.

Ore dusts stored in buffer tanks are charged into pressure vessels arranged under them. These pressure vessels are used as pressure sluices for introducing the ore dust into a preheater. This preheater, e.g., a fluidized-bed reactor or a spouted-bed reactor, as well as the adjoining horizontal fluidized-bed chute, are under vacuum.

One pressure vessel each is loaded from a buffer tank under atmospheric pressure, while the other pressure vessel is unloaded into the preheater.

The preheater is used to preheat the ore dust using the so-called top gas from the horizontal fluidized-bed chute, the reduction reactor proper.

The oncoming flow velocity in the preheater is selected to be such that ore dust with a particle size ranging from less than about 0.5 mm is very extensively removed from the preheater. This ore dust is separated via a hot gas cyclone and is fed, together with the preheater ore dust from the preheater, into the first chamber of the horizontal fluidized-bed chute, i.e., the reduction reactor proper.

The unloading of the preheater arranged upstream of the horizontal fluidized-bed chute, namely, the unloading of the particle fractions ranging from, e.g., less than about 3 mm to about 0.5 mm, takes place in an uncontrolled manner via a solids line, via which the ore dust is charged into the first chamber of the horizontal reduction reactor. This chamber is provided with a heat exchanger, by which the ore dust can be heated to a desired temperature of the fluidized bed. The fluidized bed temperature shall preferably be in the range of about 680° C. to 700° C. The oncoming flow medium and the reducing medium is preferably hydrogen, which had been previously heated to about 710° C. in a reducing gas heater. The oncoming flow velocity is selected to be such that essentially no ore dust can be discharged any more.

It is especially advantageous according to the present invention to use reducing gas heated to a high temperature to heat the heat exchanger and to allow the reducing gas leaving the heat exchanger in question to flow as the oncoming flow medium and reducing medium to the fluidized-bed chute. The reducing gas entering the first heat exchanger may have been heated to, e.g., about 850° C. It leaves this heat exchanger with a lower temperature of, e.g., 720° C. It is possible due to this arrangement to transfer the heat necessary for reducing $Fe_2O_3$ into FeO as well as for heating the ore dust completely via the heat exchanger or heat exchangers.

Only the heat for the reduction of FeO into Fe is to be supplied by the reducing gas. The reduction becomes especially efficient as a result. This has been shown by corresponding experiments.

The fluidization velocity in the first chamber of the fluidized-bed chute is set at the highest value by means of suitable and commercially available devices, namely, at such a high value in the case of, e.g., a charge particle size spectrum ranging from less than about 3.0 mm to about 0.02 mm that all the ore dust ranging from less than about 0.5 mm to about 0.02 mm is discharged with the gas flow via a separator, e.g., a hot gas cyclone in the example.

The rest of the ore dust of about 3.0 mm to about 0.5 mm remains in this chamber and is reduced there.

The ore fraction finer than about 0.5 mm, which is separated in the cyclone associated with the first chamber, is now fed into the second chamber. The fluidization velocity is set at a lower value in this second chamber than in the first chamber, namely, e.g., at such a value that the fraction between about 0.5 mm and about 0.1 mm remains in the second chamber and is reduced there, while the fraction finer than about 0.1 mm is discharged with the gas via the cyclone of the second chamber. The ore dust fraction finer than 0.1 mm separated in this cyclone is fed to the third chamber of the fluidized-bed chute, in which the fraction finer than 0.1 mm remains and is reduced.

The solids separated in the cyclone associated with the third chamber are returned into this chamber.

All the gas of the cyclones associated with the chambers enters the preheater via a collecting line.

The reduced ore dust, the ore of all three chambers in the example, is transported for further processing via pressure vessels.

The fluidized-bed chute according to the present invention does not, of course, necessarily have to have three chambers; it may also be divided into two or more than three chambers.

According to the features of the device, it may be advantageous to displace partitions between the individual chambers in the longitudinal direction of the fluidized-bed chute in such a way as to achieve an enlargement of the oncoming flow area of one chamber or to reduce the oncoming flow area of another chamber. This measure may become necessary when a change has occurred in the particle size distribution of the ore dust to be reduced, e.g., in the case of an increase in the fraction finer than 0.1 mm. The chamber with the ore dust finer than 0.1 mm can then be enlarged and that of the other chambers can be reduced by displacing the partition.

If, e.g., the fine fraction of the ore to be reduced increases even more, the length of the fluidized-bed chute may be increased by inserting a spool piece, as a result of which the oncoming flow area increases.

The first chamber may consist of two compartments, namely, the heating and pre-reduction compartment (for converting $Fe_2O_3$ into FeO), in which the heat exchanger is also accommodated, as well as the reduction compartment proper, in which the reduction to a metallization (conversion of FeO into Fe) of about 98% takes place. A heat exchanger is not absolutely necessary here, because the heat needed for the reduction may be supplied by the reducing gas.

The above-mentioned two compartments are separated by a wall. The ore dust from the first compartment must flow over this wall to enter the second compartment. The height of the wall determines the height of the fluidized bed. To avoid "dead" areas (segregations) in the fluidized bed, the wall is perforated in this chamber and in the chambers following it, advantageously in the lower part.

The completely reduced ore dust leaves the second compartment via a "high-positioned" funnel, from which the very fine reduced product is discharged pneumatically via a sluice tank.

The second chamber of the horizontal fluidized-bed chute, which is supplied with ore dust via the cyclone associated with the first chamber, also contains a heat exchanger to bring the fluidized bed to the desired temperature. This also applies to the third chamber in the example.

The endothermic reduction of FeO into Fe requires only a relatively small amount of heat for the reduction. This heat can be introduced with the reducing gas being discharged.

The fluidization velocity (oncoming flow velocity) in the second chamber is selected to be such that all the ore dust with a particle size in the range of preferably less than 0.1 mm is discharged with the gas flow, while the fine ore dust fraction in the range of about 0.5 mm to 0.1 mm remains in the first chamber and is completely reduced there.

The gas leaving the second chamber, which is preferably charged with ore dust finer than 0.1 mm, is fed to a chamber hot gas cyclone, in which a high percentage of the ore dust finer than 0.1 mm is separated from the gas flow.

The ore dust fraction finer than 0.1 mm, which is separated in this chamber hot gas cyclone, is fed to a third chamber of the horizontal fluidized-bed chute. The oncoming flow velocity in this chamber is selected to be such that the percentage of the particles in the range of 0.1 to 0.02 mm remains in this third chamber and is completely reduced. Since this ore dust, which reaches the third chamber, has already been sufficiently heated and pre-reduced, no heat exchanger may be needed for this third chamber, because the heat necessary for the reduction may be supplied by the gas alone, the fluidized bed temperature being in the range of 680° C. to 700° C.

The ore dust, which is separated in the chamber hot gas cyclone associated with the third chamber, again enters this third chamber for the final reduction.

The total amount of gas from all three chamber hot gas cyclones associated with the chambers is fed as "purified" top gas to the upright preheater as a heating medium via a collecting line.

The additional chambers following the first chamber of the horizontal fluidized-bed chute are divided into compartments with walls, similarly to the first chamber, so that back-mixing or cross-mixing of the particles is avoided. The size of the compartments may be set as needed.

Each chamber of the horizontal fluidized-bed chute contains, besides the outlet proper (a high-positioned discharge), an outlet that is arranged in the bottom of the respective last compartment. Segregated ore dust can be discharged via this outlet, which is controlled via a cellular wheel sluice. However, this discharge should only be considered an emergency discharge.

The individual chambers described have oncoming flow areas of different sizes, so that the maximum possible percentages in the fractions of 3 to 0.5 mm, 0.5 to 0.1 mm and finer than 0.1 mm should be known when designing the fluidized-bed sluice. However, a permanent change in the particle size distribution of the ore dust can be taken into account by the possibility of the above-mentioned insertion of spool pieces as well as by displacing the chamber partitions.

Spool pieces may also be inserted if the output of the horizontal fluidized-bed chute is to be increased or a longer residence time is needed because of reduced processing temperature of the ore (sticking).

The reduced ore dust is discharged from the chambers of the fluidized-bed chute via one or more sluices (pressure vessels) for further processing. Further processing is defined, e.g., as a briquetting plant or an arc furnace.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic view of one exemplary embodiment of the device according to the present invention.

DESCRIPTION OF THE PREFERRED EMBODIMENT

Referring to the drawing, the ore dust or fines to be reduced is charged into pressure vessels (i.e., vessels holding contents under pressure other than atmospheric pressure) 1 from buffer tanks 16 via controllable discharge means 12. These buffer tanks are pressureless. The ore dust is subsequently unloaded alternatingly from one pressure vessel 1 and the other into the preheater 11, e.g., a fluidized-bed reactor or a spouted-bed reactor.

The preheating of the ore dust takes place in the preheater 11, using so-called top gas, which is fed in from the chamber hot gas cyclones 6 associated with the chambers 2 of the horizontal fluidized-bed reactor via a collecting line 9. Partitions 3 separate the chambers 2.

The preheater 11 is connected via a gas discharge line 17 to a hot gas cyclone 13, in which the ore dust finer than about 0.5 mm, which is carried by the gas being discharged from the preheater 11, is separated. This separated ore dust fraction enters the solids line 15 under the preheater 11 via the solids discharge line 14. The gas leaving the hot gas cyclone 13 (top gas=throat gas) is sent into an aftertreatment unit (among other things, a gas scrubber) via a gas discharge line 18.

To discharge the preheated ore dust fraction ranging from less than 6.3 mm to about 0.5 mm, preferably from less than 3 mm to about 0.5 mm, a solids line 15 is provided under the preheater 11. The ore dust fraction is discharged in this line 15 into the first chamber 2 of the horizontal fluidized-bed reactor, in which the reduction of the ore dust begins.

The individual chambers 2 are equipped with means 5 for the controllable setting of the oncoming flow velocity of the fluidizing medium.

The ore dust completely reduced in the first chamber 2 is drawn off into a pressure vessel 10. The gas leaving this first chamber 2 with the ore dust still contained in it enters the chamber hot gas cyclone 6 associated with that chamber 2.

The completely reduced ore dust discharged from the second chamber 2 and the third chamber 2 of the horizontal fluidized-bed chute enters the downstream pressure vessels 10. It is, of course, also possible to install only one pressure vessel 10, into which the ore dust discharged from all chambers 2 is fed, instead of the three pressure vessels 10 shown in the patent figure.

The reduced ore dust from the pressure vessels 10 is fed into a means for further processing under overpressure. This may be a briquetting plant for ore dust or, e.g., an arc furnace.

The ore dust discharged with the gas from the second chamber 2 of the horizontal fluidized-bed chute is sent over a chamber hot gas cyclone 6, in which the gas is separated from the ore dust. The ore dust is drawn off into the third chamber 2 and the gas is fed as a preheating medium into the preheater 11 via the collecting line 9.

The ore dust discharged with the gas from the third chamber 2 is finally separated in the chamber hot gas cyclone 6 associated with that chamber 2 and is again sent into the third chamber 2 of the horizontal fluidized-bed chute for the final reduction.

The gas from this chamber hot gas cyclone 6 also enters as a preheating gas the oncoming flow bottom of the upright preheater 11.

To increase the economy of the reduction plant, provisions are made for using reducing gas, preferably hydrogen, heated to a high temperature for heating the heat exchangers 4 immersed into the chambers 2 of the horizontal fluidized-bed chute with gas discharge lines 19 and 20. The reducing gas leaving these heat exchangers 4 is subsequently fed as a reducing agent to the oncoming flow bottoms of the chambers 2 of the horizontal fluidized-bed chute.

All chambers 2 contain heat exchangers 4 in the exemplary embodiment. Depending on the design of the reducing plant, it may be unnecessary to equip all chambers 2 with heat exchangers 4.

While specific embodiments of the invention have been shown and described in detail to illustrate the application of the principles of the invention, it will be understood that the invention may be embodied otherwise without departing from such principles.

APPENDIX

List of Reference Numbers:
1 Pressure vessels
2 Chamber of the horizontal fluidized-bed chute
3 Partition
4 Heat exchanger
5 Means for controlling the oncoming flow velocity
6 Chamber hot gas cyclone
8 Solids discharge of the last cyclone 6
9 Collecting line from 6 to 11
10 Pressure vessel for reduced ore dust
11 Preheater for ore dust
12 Discharge means of 1
13 Hot gas cyclone of 11
14 Solids discharge line of 13
15 Solids line of 11
16 Buffer tank for ore dust
17 Gas discharge line of 11
18 Gas discharge line of 13
19 Gas admission line of 4
20 Gas discharge line of 4
[Figure]
KEY:
Erz=Ore
Top-Gas=Top gas
Produkt=Product
[END OF FILE]

What is claimed is:

1. A device for direct reduction of ore fines with a particle size spectrum, the device comprising:

a buffer tank for holding the ore fines;

a pressure vessel operatively connected to said buffer tank, said pressure vessel being pressurized and including a controllable discharge;

a preheater connected to said discharge of said pressure vessel, said preheater preheating the ore fines, said preheater being one of a fluidized-bed reactor and a spouted-bed reactor;

a preheater discharge line connected to said preheater;

a hot gas cyclone arranged connected downstream of said preheater with a gas discharge line for discharging top gas to be subjected to aftertreatment;

a fluidized-bed reactor divided by partitions into a plurality of chambers including a first chamber;

a solids discharge line from said hot gas cyclone to said preheater discharge line for conveying the preheated ore fines from said preheater, wherein said preheater discharge line for preheated ore fines opens into said first chamber of said fluidized-bed reactor;

heat exchangers, each heat exchanger extending into a corresponding one of said chambers;

structure associated with said fluidized bed reactor setting fluidization velocity in individual said chambers, wherein said fluidization velocity is reduced from one said chamber to a next said chamber;

a plurality of chamber hot gas cyclones arranged downstream of each said chamber for separating a defined particle fraction of the ore fines, wherein said particle fraction separated can be fed into a respective next or last of said chambers;

a collecting line through which a total amount of gas of all said chamber hot gas cyclones is sent as a heating medium into said preheater; and pressure vessels for collection, said pressure vessels for collection being arranged under each said chamber for discharging and transporting reduced ore fines for further processing.

2. A device in accordance with claim 1, wherein:

said fluidized-bed reactor is a horizontal fluidized-bed reactor and uses hydrogen as a reducing gas; and said defined particle fraction of the ore fines of said chamber hot gas cyclones ranges from less than 6.3 mm to approximately 0.5 mm.

3. A device in accordance with claim 1, wherein:

said defined particle fraction of the ore fines of said chamber hot gas cyclones ranges from less than 3.0 mm to approximately 0.5 mm.

4. A device in accordance with claim 1, wherein:

said heat exchangers include gas admission lines through which the reducing gas heated to a high temperature flows to heat said heat exchangers;

said heat exchangers each include a gas discharge line with a discharge at a bottom of an associated chamber, allowing the reducing gas leaving said heat exchangers to flow into the bottom of said associated chamber.

5. A device in accordance with claim 1, wherein:

said partitions are displaceable to vary oncoming flow areas of said chambers of said fluidized-bed reactor.

6. A device in accordance with claim 4, wherein:

said partitions are displaceable to vary flow areas of said chambers of said fluidized-bed reactor.

7. A device in accordance with claim 6, wherein:

a chamber spool piece is inserted into said fluidized-bed reactor to enlarge said flow area of said fluidized-bed reactor.

8. A process for the direct reduction of ore fines, the process comprising the steps of:

feeding the ore fines into a preheater under overpressure for preheating in a controlled manner;

discharging said preheated ore fines into a horizontal fluidized-bed reactor, said fluidized-bed reactor being divided into a plurality of chambers by partitions, to form at least a first chamber and a last chamber;

heating said horizontal fluidized-bed reactor by reducing gas heated to a high temperature;

heating and reducing the ore fines in said chambers;

flowing gases through said chambers, a fluidization velocity of the gases is highest in said first chamber and decreases from said first chamber to said last chamber, so that certain particle fractions of the ore fines are discharged from each of said chambers together with said gases, and are subsequently separated into ore fines and gas, wherein said separated ore fines are fed from said first chamber into a next chamber or said last chamber, and wherein respective coarser particle fractions of the ore fines remain in respective said chambers;

feeding the gases from all said chambers, which are separated from the ore fines, into said preheater;

separating solids from solids-containing hot gases discharged from said preheater, wherein said separated solids are fed into said first said chamber of said horizontal fluidized-bed reactor and said hot gases are fed into a means for aftertreatment;

subjecting gases from all said chambers, which are separated from the ore fines, to further ore dust-gas separation;

feeding gases from said further ore dust-gas separation as a heating medium into said preheater;

feeding ore fines remaining in individual said chambers into an aftertreating vessel under pressure.

9. A process for the direct reduction of ore fines, the process comprising the steps of:

preheating the ore fines;

providing a horizontal fluidized bed chute divided into a plurality of adjacent chambers;

feeding the ore fines after preheating to said plurality of chambers;

reducing the ore fines in said plurality of chambers;

flowing gases through said chambers to remove a discharge fraction of the ore fines from said chambers with said flowing gases and leave a remainder fraction of the ore fines in said chambers, said discharge fraction being smaller in particle size than said remainder fraction of the ore fines in said chambers, a velocity of said gasses flowing through said chambers decreasing from a first chamber of said adjacent chambers to a last chamber of said adjacent chambers;

separating said discharge fraction from said flowing gases from each of said chambers;

feeding said discharge fraction of one chamber of said chambers into a subsequent chamber of said chambers after said step of separating;

using said flowing gases from said chambers for said step of preheating after said step of separating said discharge fraction.

10. A process in accordance with claim 9, wherein:

said discharge fraction from a final chamber of said chambers is feed back into said final chamber after said separating.

11. A process in accordance with claim 9, wherein:

solid containing gases from said step of preheating are separated into solids and top gas;

said solids are fed to a first of said plurality of chambers.

12. A process in accordance with claim 11, wherein: said step of preheating includes providing a preheater with overpressure for preheating in a controlled manner; and said horizontal fluidized bed chute reactor is divided into said chambers by a plurality of partitions and said fluidized bed chute is heated by a reducing gas of hydrogen heated to a high temperature; and further comprising:

heating and reducing the ore fines in said chambers;

feeding top gas for aftertreatment use;

subjecting gases which have been separated from the ore fines in said chambers to a further ore fine-gas separation;

feeding the ore fines remaining in individual said chambers into one or more vessel under pressure.

* * * * *